US010351683B2

(12) United States Patent
Vautard et al.

(10) Patent No.: US 10,351,683 B2
(45) Date of Patent: Jul. 16, 2019

(54) METHOD OF IMPROVING ADHESION OF CARBON FIBERS WITH A POLYMERIC MATRIX

(71) Applicant: UT-BATTELLE, LLC, Oak Ridge, TN (US)

(72) Inventors: Frederic Vautard, Simpsonville, SC (US); Soydan Ozcan, Oak Ridge, TN (US); Felix Leonard Paulauskas, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 384 days.

(21) Appl. No.: 15/158,036

(22) Filed: May 18, 2016

(65) Prior Publication Data
US 2016/0257797 A1 Sep. 8, 2016

Related U.S. Application Data

(62) Division of application No. 13/406,732, filed on Feb. 28, 2012, now Pat. No. 9,365,685.

(51) Int. Cl.
C08J 5/06 (2006.01)
C08J 5/24 (2006.01)
C08L 63/10 (2006.01)

(52) U.S. Cl.
CPC . *C08J 5/06* (2013.01); *C08J 5/24* (2013.01); *C08L 63/10* (2013.01); *C08J 2333/04* (2013.01); *C08J 2363/00* (2013.01); *C08J 2463/00* (2013.01); *Y10T 428/249948* (2015.04); *Y10T 428/2918* (2015.01)

(58) Field of Classification Search
CPC .......................................................... C08J 5/06
USPC ........................................................ 427/333
See application file for complete search history.

(56) References Cited

U.S. PATENT DOCUMENTS

| 3,770,690 | A | * | 11/1973 | Oswitch | C08J 5/00 |
| | | | | | 264/338 |
| 3,779,981 | A | | 12/1973 | Ward | |
| 3,806,489 | A | | 4/1974 | Rieux et al. | |
| 3,844,916 | A | | 10/1974 | Gaske | |
| 4,714,642 | A | | 12/1987 | McAliley et al. | |
| 4,781,947 | A | | 11/1988 | Saito et al. | |
| 5,338,789 | A | | 8/1994 | Grosse-Puppendahl et al. | |
| 5,677,398 | A | | 10/1997 | Motoshima et al. | |
| 6,011,078 | A | | 1/2000 | Reich et al. | |
| 6,013,730 | A | | 1/2000 | McGrail et al. | |
| 6,500,878 | B1 | | 12/2002 | Reich et al. | |
| 7,431,789 | B2 | | 10/2008 | Mack et al. | |
| 9,617,398 | B2 | | 4/2017 | Vautard et al. | |
| 2002/0007022 | A1 | | 1/2002 | Oosedo et al. | |
| 2005/0119395 | A1 | | 6/2005 | Moireau | |
| 2006/0083922 | A1 | | 4/2006 | Kashikar et al. | |
| 2008/0255332 | A1 | | 10/2008 | Defoort et al. | |
| 2009/0062442 | A1 | * | 3/2009 | Wei | C08G 59/08 |
| | | | | | 524/198 |
| 2010/0068497 | A1 | | 3/2010 | Harrington | |
| 2010/0092695 | A1 | | 4/2010 | Schultz et al. | |
| 2010/0178495 | A1 | | 7/2010 | Taketa et al. | |
| 2013/0224470 | A1 | | 8/2013 | Vautard et al. | |

FOREIGN PATENT DOCUMENTS

JP 2006-152161 6/2006

OTHER PUBLICATIONS

Vautard, Carbon Fiber-Vinyl Ester Interfacial Adhesion Improvement by the Use of a Reactive Epoxy Coating, ICCM17, Edinburgh UK, Jul. 30, 2009 (Year: 2009).*
Kong, Structure-Property Relations of Polyethertriamine-Cured Bisphenol-A-diglycidyl Ether Epoxies, ACS Symposium Series, 221 (1983), p. 211-227 (Year: 1983).*
Park, Effect of Atmospheric Plasma Treatment of Carbon Fibers on Crack Resistance of Carbon Fibers-reinforced Epoxy Composites, vol. 6, No. 2, Jun. 2005, p. 106-110 (Year: 2005).*
Burton, Epoxy Formulations Using Jeffamine Polyetheramines, Huntsman, 2005, p. 1-103 (Year: 2005).*
United States Office Action dated Jul. 6, 2018 issued in U.S. Appl. No. 15/158,012.
United States Office Action dated Mar. 30, 2018 issued in U.S. Appl. No. 15/158,053.

(Continued)

*Primary Examiner* — Tabatha L Penny
(74) *Attorney, Agent, or Firm* — Scully Scott Murphy & Presser

(57) ABSTRACT

A method of making a carbon fiber having on its surface a partially cured sizing agent, the method comprising covalently binding on the surface of said carbon fiber a sizing agent comprised of an epoxy resin, and partially curing said sizing agent by contact thereof with a curing agent such that at least a portion of epoxide groups remain uncrosslinked on said surface, which corresponds to a curing degree of epoxide groups of no more than about 0.6, and further comprising reacting at least a portion of said epoxide groups with a bifunctional molecule that contains first and second reactive groups, the first reactive group being reactive with and forming a covalent bond with the epoxy group, and the second reactive group being unsaturated and accessible for reaction with a carbon-carbon double bond of an unsaturated resin via a vinyl addition reaction.

17 Claims, No Drawings

(56) References Cited

OTHER PUBLICATIONS

Allred R.E. et al., "Aqueous-Based Emulsion Reactive Finishes for Improving Carbon/Vinyl Ester Interfacial Bonding", Proc. 50th Intl. SAMPE Symp. and Exhib, Long Beach, CA, 16 pages (May 1-5, 2005).

Broyles N.S. et al., "Fatigue Performance of Carbon Fibre/Vinyl Ester Composites: the Effect of Two Dissimilar Polymeric Sizing Agents", Polymer, 39(15):3417-3424 (1998).

Kang H.M. et al., "Plasma Etching and Plasma Polymerization Coating of Carbon Fibers. Part 1. Interfacial Adhesion Study", J. Adhesion Sci. Technol., 16(13):1809-1823 (2002).

Kang H.M. et al., "Effect of Solubility and Miscibility on the Adhesion Behavior of Polymer-Coated Carbon Fibers With Vinyl Ester Resins", Journal of Applied Polymer Science, 79:1042-1053 (2001).

Kim I-C et al., "Enhanced Interfacial Adhesion of Carbon Fibers to Vinyl Ester Resin Using Poly(Arylene Ether Phosphine Oxide) Coatings as Adhesion Promoters", J. Adhesion Sci. Technol., 14(4):545-559 (2000).

Robertson M.A.F. et al., "Designed Interphase Regions in Carbon Fiber Reinforced Vinyl Ester Matrix Composites", J. Adhesion, 71:395-416 (1999).

Vautard F. et al., Major Accomplishments in Composite Materials and Sandwich Structures: An Anthology of ONR Sponsored Research "Carbon-Fiber-Vinyl Ester Interfacial Adhesion Improvement by the Use of an Epoxy Coating", Springer Science+Business Media B.V., I.M. Daniel et al. (eds.), pp. 27-50 (2009).

Vautard F. et al., "Carbon Fiber-Vinyl Ester Interfacial Adhesion Improvement by the Use of a Reactive Epoxy Coating", Proc. 17th Intl. Conf. on Composite Materials (ICCM 17), Edinburgh, UK 11 pages (Jul. 27-31, 2009).

Verghese K.N.E. et al., "Pultruded Carbon Fiber/Vinyl Ester Composites Processed With Different Fiber Sizing Agents. Part II: Enviro-Mechanical Durability", Journal of Materials in Civil Engineering, 17(3):334-342 (Jun. 1, 2005).

Yamada K. et al., "Plasma-Graft Polymerization of a Monomer With Double Bonds onto the Surface of Carbon Fiber and its Adhesion to a Vinyl Ester Resin", Journal of Applied Polymer Science, 90:2415-2419 (2003).

U.S. Office action dated May 30, 2017 issued in U.S. Appl. No. 15/158,012.

* cited by examiner

METHOD OF IMPROVING ADHESION OF CARBON FIBERS WITH A POLYMERIC MATRIX

CROSS REFERENCE TO RELATED APPLICATION

This application is a divisional of U.S. patent application Ser. No. 13/406,732, filed Feb. 28, 2012, the content of which in its entirety is incorporated herein by reference.

This invention was made with government support under Prime Contract No. DE-AC05-00OR22725 awarded by the U.S. Department of Energy. The government has certain rights in the invention.

FIELD OF THE INVENTION

The present invention relates, generally, to composites made of carbon fibers and a polymeric matrix, and also to the use of sizing agents in order to modify the interfacial interactions between two phases of a solid composite.

BACKGROUND OF THE INVENTION

Carbon fiber reinforced composites are known for their outstanding mechanical properties associated with a low density. Some of those outstanding mechanical properties include superior tensile, flexural, and shear properties and impact resistance. For this reason, they have been of interest to many fields, particularly for rugged applications, such as the space and aeronautics industries, military equipment, transportation, and infrastructure.

Carbon fiber-epoxy composites are particularly used in such rugged applications. Although there has been a desire to extend the application of carbon fiber-epoxy composites to more commonplace markets, such as the automotive industry, tools, appliances, and sporting and recreational goods, their extension into these other markets has been substantially impeded by the higher cost of high performance epoxy resins relative to other resin systems. Less costly substitutes of epoxy resin have been sought, but the mechanical properties of these substitutes have thus far not approached the outstanding mechanical properties provided by high performance epoxy resins.

Vinyl ester resins are less costly than high performance epoxy resins, and are widely used, particularly because of their high resistance to moisture absorption and corrosion. Thus, vinyl ester resins would be a highly desirable substitute for an epoxy resin if only the resulting carbon fiber-vinyl ester resin composite could approach the outstanding mechanical properties provided by epoxy resin-based composites. However, the mechanical properties of carbon fiber-vinyl ester composites cannot currently compete with the mechanical properties of carbon fiber-epoxy composites. For this reason, carbon fiber-vinyl ester resin composites have not been considered for applications in which outstanding mechanical properties (e.g., high strength and ruggedness) are required.

The physico-chemical and mechanical properties of a composite material are not only dependent on the characteristics of the reinforcement material and the matrix, but also on the properties of the interface, which generally also depend on the conditions used during manufacturing. Some of the factors influencing interfacial adhesion include mechanical interlocking, physical and chemical interactions, the presence of defects, and residual thermal cure stress. In order to improve interfacial adhesion between the surface of a carbon fiber and a matrix, the properties of the carbon fiber surface can be modified by employing different types of surface treatments on the carbon fiber. Although some research has been conducted on carbon fiber surface treatment adapted to vinyl ester resin-based composites, the research is relatively limited and the mechanical properties that are obtained remain highly deficient in comparison to the properties provided by epoxy based systems.

Most of the techniques considered thus far for improving physical properties of vinyl ester composites aim at improving interfacial adhesion between the carbon fibers and the vinyl ester matrix by using the same approach used for epoxy-based systems, i.e., creating a covalent bonding between the surface of the carbon fiber and the matrix. For example, an epoxy sizing (carbon fiber coating) is typically partially cured during the composite manufacturing process. Indeed, the curing agent added to the epoxy matrix diffuses from the matrix to the sizing. However, when the same epoxy sizing is used on carbon fiber to make vinyl ester and polyester composites, the curing agent of the matrix (radical initiator) is not compatible with the polymerization of the epoxy sizing and is simply not effective in generating a suitable or optimal interface/interphase between the fibers and the matrix. Moreover, current technologies also do not take into account a specific property of vinyl ester resins (as well as of polyester resins), which is their high cure volume shrinkage. The cure volume shrinkage is typically 7% and higher for vinyl ester resins and up to 11% for polyester resins, in comparison with the 3-4% cure volume shrinkage experienced with epoxy resins.

Attempts at adjusting the surface properties of the carbon fibers using sizing agents have been made in an effort to counteract this adverse shrinkage phenomenon. Such efforts generally rely on mixing epoxy resins with a stoichiometric amount of curing agent (i.e., the curing degree of the epoxy reaches a value between 0.9 and 1). However, when a stoichiometric amount of curing agent is used in a sizing on carbon fiber, it results in an overactive curing state in which the cure of the epoxy sizing agent occurs at room temperature and continues until complete if left in ambient conditions for too long, e.g., over a day or more. Thus, using existing methodologies, it becomes necessary to control the time between the sizing of the fibers and the manufacture of the vinyl ester composite, in order to have components of the vinyl ester matrix (which commonly includes styrene) in contact with the epoxy sizing when its curing degree (i.e., fraction conversion or curing fraction) is optimal, such as 0.5, when the carbon fiber is more flexible. With longer curing times, the value of the curing degree continues to rise, resulting in a hard sizing that leads to rigid fibers, and rigid fibers are not suitable for composite processes. For this reason, the sizing or the sized fibers cannot be stored, which substantially obviates the implementation of this approach in most industrial applications. Moreover, the initiator of the vinyl ester matrix (e.g., peroxide) can react with amines, which are typically used as the curing agent for epoxy resins (and the epoxy sizing in this approach). The curing of the vinyl ester matrix and the epoxy sizing can be affected in the interdiffusion zone if these two curing agents are in contact and react with each other.

SUMMARY OF THE INVENTION

The present invention relies on adding a curing agent to an epoxy sizing in a concentration substantially below the stoichiometric amount, so that the curing degree reached by the epoxy sizing is no higher than a fixed gelation value (i.e., no higher than a fixed value corresponding to the gelation of the sizing) and the curing of the epoxy sizing has already stopped when the polymer matrix (e.g., vinyl ester) components are admixed with the fiber to form the composite. For purposes of the present invention, the maximal value of the curing degree of the epoxy sizing is a value corresponding to the gel point, which leads to an optimal interdiffusion with the matrix. In the specific case of a vinyl ester composite, the entire amount of curing agent reacts before the manufacturing of the composite, so that it is not available to react with the radical initiator of the matrix in the interdiffusion zone. Since the sizing remains as a gel, the tow remains flexible and can, thus, be more easily processed. Moreover, the epoxy sizing provides significant advantages with respect to the processing of the carbon fibers, such as a substantial resistance to damage of the fibers from rubbing and scraping.

In one aspect, the invention is directed to a carbon fiber having covalently bonded on its surface a partially cured sizing agent containing an epoxy resin, wherein at least a portion of epoxide groups in the sizing agent are available as uncrosslinked epoxide groups to maintain the sizing agent in flexible form, which corresponds to a curing degree of epoxide groups of no more than about 0.6. In other embodiments, the curing degree of epoxide groups is no more than about 0.5, 0.4, 0.35, or 0.3.

In another aspect, some molecules are grafted on the uncrosslinked epoxide groups so that the sizing has some functionalities able to create covalent bonding with the matrix. Those molecules contain functionalities able to create covalent bonding with the uncrosslinked epoxide groups and functionalities able to create covalent bonding with the matrix.

In another aspect, the epoxy sizing can contain some functionalities that are able to create a covalent bonding with the matrix by using molecules that contain both epoxide groups and the functionalities creating the covalent boding with the matrix. The epoxide groups of those molecule react with the curing agent of the epoxy resin used in the sizing. A covalent bonding is then created between the epoxy sizing and the matrix. The concentration of curing agent is then optimized in order to react with those additional epoxide groups and to maintain the same properties as the ones obtained with a partially cured epoxy sizing, as described before in terms of flexibility of the sized fibers.

In another aspect, an amino-based sizing agent (e.g., polyamino monomer or polymer) is used as the sizing agent. In this situation, an epoxy-based curing agent or other amine-reactive curing agent can be used as a curing agent of the amino-based sizing agent. The concentration of epoxy curing agent is again preferably used in an amount less than the stoichiometric amount. The uncrosslinked amine functionalities are preferably able to create covalent bonding with the carbon fiber surface and the matrix. As the sizing remains as a gel and the tow remains flexible, the carbon fiber can be more easily processed. Moreover, the amine sizing provides significant advantages with respect to the processing of the carbon fibers, such as a substantial resistance to damage of the fibers from rubbing and scrapping.

In another aspect, the carbon fiber is coated with a partially crosslinked epoxy or amine sizing and the matrix contains a co-monomer that is able to create covalent bonding with the uncrosslinked epoxide or amine functionalities of the sizing, respectively, and is able to participate in the polymerization mechanism of the matrix, so that a covalent bonding is also created with the polymer network of the matrix.

In yet another aspect, the invention is directed to a solid composite in which carbon fibers functionalized with a partially cured sizing agent, described above, are embedded in a polymeric matrix. The polymeric matrix can be a thermoset or thermoplastic polymer, particularly a vinyl ester resin or an unsaturated polyester resin. The invention is also directed to a device or apparatus that contains the composite, such as a protective or impact-resistant layer, coating, or film, or an interior or exterior siding or surface of a structure, such as an automobile, aircraft, or building, or a tool or appliance, particularly where a lightweight high-strength material is desired.

In still another aspect, the invention is directed to a method of making the solid composite described above. The method includes admixing functionalized carbon fibers, described above, with a polymer precursor resin, and curing the polymer precursor resin to form a cured polymeric matrix that contains the functionalized carbon fibers embedded therein.

The methods and compositions described herein overcome the significant drawbacks, as discussed above, associated with using a curing agent in a stoichiometric amount. Moreover, in the case of a thermoplastic matrix, it is common knowledge that the interactions between the carbon fiber surface and the thermoplastic matrix can induce a partial crystallization of the thermoplastic in the vicinity of the fiber surface, thereby leading to poor mechanical properties in an interphase zone between the carbon fiber surface and the matrix. However, the use of a polymer-based sizing, as further described in this application, can prevent that effect.

DETAILED DESCRIPTION OF THE INVENTION

In a first aspect, the invention is directed to a carbon fiber having covalently bound on its surface a partially cured sizing agent containing an epoxy resin. At least a portion of epoxide groups in the sizing agent are available as uncrosslinked epoxide groups, which corresponds to a fraction conversion (curing degree) of epoxide groups that maintains the sizing agent in flexible form, such as a gel. To maintain the sizing agent in flexible form, the curing degree of epoxide groups is preferably no more than about 0.6. As used herein, and as generally recognized in the art, the terms "curing degree of epoxide groups" refers to the number of epoxide groups that have undergone ring-opening crosslinking relative to the number of epoxide groups that were originally uncrosslinked before the cure of the epoxy. In different embodiments, the curing degree of epoxide groups is no more than 0.6, 0.55, 0.5, 0.45, 0.4, 0.35, 0.3, 0.25, 0.2, 0.15, or 0.1, or a curing degree within a range bounded by any two of the foregoing values. As used herein, the term "about" generally indicates within ±0.5%, 1%, 2%, 5%, or up to ±10% of the indicated value.

The carbon fiber can be any of the high strength carbon fiber compositions known in the art. As known in the art, the carbon fiber has its length dimension longer than its width dimension. Some examples of carbon fiber compositions include those produced by the pyrolysis of polyacrylonitrile (PAN), viscose, rayon, pitch, lignin, polyolefins, as well as vapor grown carbon nanofibers, single-walled and multi-walled carbon nanotubes, any of which may or may not be heteroatom-doped, such as with nitrogen, boron, oxygen, sulfur, or phosphorus. The invention also applies to two-dimensional carbon materials, e.g., graphene, graphene oxide, graphene nanoribbons, which may be derived from, for example, natural graphite, carbon fibers, carbon nanofibers, single walled carbon nanotubes and multi-walled carbon nanotubes. The carbon fiber considered herein generally possesses a high tensile strength, such as at least 500, 1000, 2000, 3000, 5000, 10,000 or 20,000 MPa, with a degree of stiffness generally of the order of steel or higher (e.g., 100-1000 GPa).

For purposes of the instant invention, the carbon fibers preferably have epoxy-reactive groups on the carbon fiber surface. Some examples of epoxy-reactive groups include hydroxyl (OH), carboxyl (COOH), and amino (e.g., $NH_2$) groups, any of which can be on the surface of the carbon fiber. Carbon fibers can be surface-functionalized with such reactive groups by methods well known in the art, such as by an oxidative surface treatment. Moreover, such surface-functionalized carbon fibers are also commercially available.

The partially cured sizing is composed, minimally, of an epoxy resin that has been partially cured with a curing agent. The epoxy resin may or may not also be in admixture with one or more other polymer(s) or molecule(s). The additional polymer or molecule can serve, for example, to provide reactive groups for covalently bonding with the matrix polymer in the composite. In a particular embodiment, the additional polymer or molecule contains at least one epoxy-reactive group and at least one group reactive with the matrix. The additional polymer or molecule is made to bond, via crosslinking or addition, to the epoxide groups of the sizing by virtue of its epoxy-reactive groups, and has a matrix-reactive group still available for bonding with the matrix. The epoxy-reactive group can be, for example, a hydroxyl (e.g., alcohol or phenol), carboxylic acid, thiol, amine, or amide group. The matrix-reactive group can be, for example, a vinyl, acetylenic, isocyanate, acrylate, methacrylate, or thiol group. For example, 1,2-diepoxy-9-decene can be admixed with the epoxy resin. This molecule has an epoxide group to create a covalent bond with the curing agent of the epoxy sizing and a vinyl group to create a covalent bond with the unsaturated matrix.

The epoxy sizing can be made to covalently bond to the surface of the carbon fiber by reacting its epoxide groups with epoxy-reactive groups located on the carbon fiber surface (e.g., surface hydroxyl, carboxyl, and amino groups, as described above). In other embodiments, a first polymer or molecule containing at least one epoxide group or epoxy-reactive group is reacted with the carbon fiber surface, and then the epoxy sizing is reacted with the first polymer or grafted molecule. The epoxide reactive group can be, for example, a hydroxyl (e.g., alcohol or phenol), carboxylic acid, thiol, amine, or amide group. For example, an epoxide group can be first grafted at the surface of the fiber by exposing the carbon fiber surface to a solution of ethylene glycol diglycidyl ether (e.g., 0.5 wt %) in water and exposing the wet fiber to a temperature of about 150° C. for about 30 minutes.

Preferably, the epoxy resin being bound to the carbon fiber surface possesses at least two epoxide groups, and thus, can be a difunctional, trifunctional, tetrafunctional, or a higher functional epoxy resin. In many embodiments, the epoxide group is present as a glycidyl group. The epoxy resin can be conveniently expressed by the following generic structure:

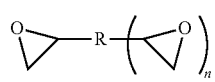

(1)

In Formula (1), n is precisely or at least 1, 2, 3, 4, 5, 6, or any suitable number, including a higher number (e.g., 10, 20, 30, 40, or 50) typical for a polymer having epoxide-containing units. The group R is a saturated or unsaturated hydrocarbon linking group having at least one and up to any suitable number of carbon atoms. In different embodiments, R can have precisely or at least, for example, 1, 2, 3, 4, 5, 6, 7, 8, 9, 10, 12, 15, 18, 20, 25, 30, 35, 40, or 50 carbon atoms, or a number of carbon atoms within a range bounded by any two of these values. Some examples of saturated hydrocarbon groups suitable as R include straight-chained or branched alkylene groups or cycloalkylene groups, such as methylene (i.e., $-CH_2-$), ethylene (i.e., $-CH_2CH_2-$), n-propylene (i.e., $-CH_2CH_2CH_2-$, or "trimethylene"), isopropylene ($-CH(CH_3)CH_2-$), tetramethylene, pentamethylene, hexamethylene, $-C(CH_3)_2CH_2-$, $-CH(CH_3)CH(CH_3)-$, $-CH_2C(CH_3)_2CH_2-$, cyclopropylene (i.e., cyclopropyldiyl), 1,3-cyclobutylene, 1,2-cyclopentylene, 1,3-cyclopentylene, 1,2-cyclohexylene, 1,3-cyclohexylene, and 1,4-cyclohexylene. Some examples of unsaturated hydrocarbon groups having 1 to 4 carbon atoms include straight-chained or branched alkenylene or alkynylene groups or cycloalkenylene groups, such as vinylene ($-CH=CH-$), allylene ($-CH_2-CH=CH-$), $-CH_2-CH_2-CH=CH-$, $-CH_2-CH=CH-CH_2-$, $-CH=CH-CH=CH-$, ethynyl, ethynyl-containing hydrocarbon groups, 1,3-cyclopentenediyl, 1,4-cyclohexenediyl, as well as aromatic linking groups, such as 1,2-, 1,3-, and 1,4-phenylene, 4,4'-biphenylene, naphthalen-1,5-diyl, and bisphenol A ether groups. The foregoing exemplified linking groups for R are suitable for linking two epoxide groups. However, a generic set of trifunctional, tetrafunctional, and higher functional epoxy resins are also considered herein wherein one, two, or a higher number of hydrogen atoms from any of the exemplified linking groups provided above for R are replaced by one, two, or a higher number of epoxide groups, respectively (e.g., 1,3,5-triglycidylbenzene). Any two, three, or more linking groups identified above can be linked together as well, such as two methylene groups on a phenylene group, i.e., $-CH_2-C_6H_4-CH_2-$.

In some embodiments, the hydrocarbon group R contains only carbon and hydrogen atoms. In other embodiments, the hydrocarbon group R also includes one, two, three, or more heteroatoms or heteroatom groups. The heteroatoms are typically one or more selected from oxygen (O), nitrogen (N), sulfur (S), or a halogen, such as, for example, fluorine, chlorine, bromine, and iodine atoms. Heteroatoms can be included as, for example, ether ($-O-$), amino ($-NH-$, $-N=$, or as a tertiary amine group), or thioether. Some heteroatom groups include hydroxy (OH), carbonyl ($-C(=O)-$), organoester ($-C(=O)O-$), amide ($-C(=O)NH-$), urea, carbamate, and the like. The heteroatom or heteroatom-containing group can either insert between two carbon atoms engaged in a bond, or between carbon and hydrogen atoms engaged in a bond, or replace a carbon or hydrogen atom. A particular example of a linking group R containing two oxygen atoms is bisphenol A, which is typically di-etherified with glycidyl groups.

In particular embodiments, the epoxy resin is a glycidyl derivative, which can be conveniently expressed as a sub-generic formula of Formula (1) above by the following structural formula:

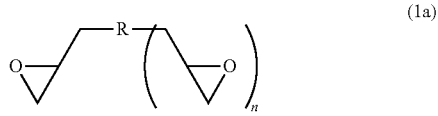
(1a)

The glycidyl derivative can be any of those compounds containing glycidyl groups, typically produced by reacting epichlorohydrin with a polyhydric molecule, such as a dihydric, trihydric, or tetrahydric molecule. The polyhydric molecule can be, for example, a polyhydric alcohol, i.e., polyol (e.g., diol, triol, or tetrol, or generically defined as R—(OH)$_n$, where n is as above except that it is a minimum of 2), polyamine (e.g., diamine, triamine, or tetramine), or polycarboxylic acid (e.g., malonic, succinic, glutaric, adipic, or terephthalic acids).

Some particular examples of difunctional epoxy resins include diglycidyl ethers of a diol (i.e., glycol), wherein some examples of diols include ethylene glycol, diethylene glycol, triethylene glycol, propylene glycol, 1,3-propanediol, 1,4-butanediol, 1,5-pentanediol, 1,6-hexanediol, tetraethylene glycol, pentaethylene glycol, bisphenol A, bisphenol AF, bisphenol S, neopentyl glycol, 2,2,4,4-tetramethyl-1,3-cyclobutanediol, catechol, resorcinol, dihydroxyquinone, thiodiglycol, and 4,4'-dihydroxybiphenyl, as well as epoxy prepolymer resins of the following general formula (where m can be 0, 1, 2, 3, 4, 5, 10, or a number up to, for example, 20, 25, 30, 40, or 50 or a number within a range bounded by any two of these values):

phenol A diglycidyl ether. In a more particular embodiment, the carbon fiber surface is grafted with epoxide groups, such as by treatment with a solution (e.g., 0.5%, 1%, or 2% by weight) of ethylene glycol diglycidyl ether in water or aqueous solution, while undergoing (or followed) by thermal treatment of the wet carbon fibers at an elevated temperature of, for example, 80° C., 90° C., 100° C., 110° C., 120° C., 130° C., 140° C., 150° C., 160° C., 170° C., or 180° C., or a temperature within a range bounded by any two of the foregoing values, before coating with an overlayer of a different glycidylated material. The advantage of the foregoing primer process is that it provides a denser covalent grafting of epoxide groups at the surface of the fiber, which increases the number of covalent binding sites between the epoxy sizing and carbon fiber surface.

The curing agent for the epoxy resin can be any of the curing agents known in the art for this purpose. Typically, the curing agent is a polyamine, such as a diamine, triamine, tetramine, or higher polyamine, such as an amine-containing polymer, wherein it is understood that the polyamine contains at least two amino groups selected from primary, secondary, and tertiary amines. The polyamine can be conveniently expressed as R—(NH$_2$)$_n$, wherein R and n are as defined above in Formula (1), and one or two hydrogen atoms of the amino group may be replaced with a linker R or a hydrocarbon group (a protonated form of any of the linking groups R), which may itself also contain a primary, secondary, or tertiary amine group. Some examples of polyamine curing agents include ethylene diamine (EDA),

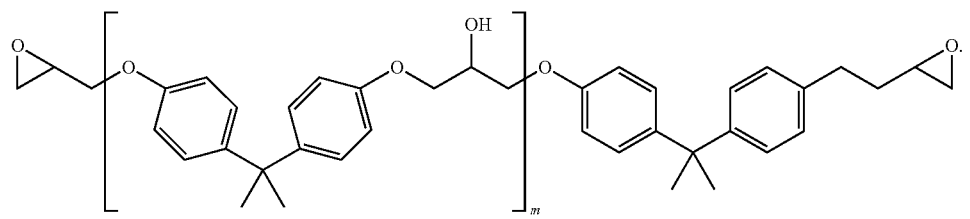
(2)

Some particular examples of trifunctional and tetrafunctional epoxy resins include triglycidyl and tetraglycidyl ethers of a triol or tetrol, respectively, wherein some examples of triols include glycerol, 1,3,5-trihydroxybenzene (phloroglucinol), trimethylolethane, trimethylolpropane, triethanolamine, and 1,3,5-triazine-2,4,6-triol (cyanuric acid). An example of a tetrol is pentaerythritol.

The difunctional, trifunctional, tetrafunctional, or higher functional epoxy resin can also be, for example, a diglycidyl, triglycidyl, tetraglycidyl, or higher polyglycidyl ether of a phenol novolak resin or bisphenol A novolak resin. Such resins are well known in the art, as described, for example, in U.S. Pat. No. 6,013,730, which is herein incorporated by reference in its entirety.

In some embodiments, one of the di-, tri-, tetra-, or higher glycidylated materials described above is used as a primer to coat (and bond with) the carbon fiber, and a second (i.e., overlayer) of di-, tri-, tetra-, or higher glycidylated material is coated onto the primer. Typically, a thermal treatment is applied after applying the primer coat and before applying the overlayer. For example, in some embodiments, ethylene glycol diglycidyl ether is applied as a primer onto the carbon fiber surface, a thermal treatment is applied, followed by an overlayer of a different glycidylated material, such as bisdiethylenetriamine (DETA), triethylenetetramine (TETA), tetraethylenepentamine (TEPA), piperazine, guanidine, 2-cyanoguanidine (dicyandiamide), aromatic amines (e.g., diaminobenzene, methylenedianiline, and 3,3'- and 4,4'-diaminodiphenylsulfones), polyethylene glycol-based polyamines (e.g., triethylene glycol diamine or tetraethylene glycol diamine, or as provided by the commercially available polyetheramine JEFFAMINE® series of compositions), m-phenylenediamine, imidazole, 2-methylimidazole, diethylaminopropylamine, isophoronediamine, m-xylenediamine, as well as their N-alkyl (e.g., N-methyl or N-ethyl) analogs, provided that at least two amino groups selected from primary and secondary amines are provided in the curing agent.

The invention is also directed to a carbon fiber having covalently bound on its surface a partially cured amino-containing sizing agent. The amino-containing sizing agent can be a polymer (e.g., a polyamino or multi-amino polymer) or amino-containing molecule. The amino-containing sizing agent can be, for example, any of the amine-based curing agents listed above. The uncrosslinked amine functionalities can covalently bond with a variety of matrices, such as acrylate and a number of thermoplastic matrices, such as polycarbonates, polyesters, poymethacrylic acids, polymethylacrylates, polymethylmethacrylates, Nylon 6, Nylon 6,6, polyether ether ketones, polysulfones, polyvinylalcohol, polyimides, and other thermoplastic matrices that contain a functionality able to react with available amines and create a covalent bonding between the multi-amine sizing and the thermoplastic matrix.

The amino-containing sizing can be made to covalently bond to the surface of the carbon fiber by reacting its amine groups with amine-reactive groups located on the carbon fiber surface (e.g., epoxide, carboxyl, carboxyl ester, aldehyde, or acrylate groups). In other embodiments, a first polymer or molecule containing at least one epoxide group or other amine-reactive group (epoxide, carboxyl, carboxyl ester, aldehyde or acrylate groups) is reacted with the carbon fiber surface, and then the amine-containing sizing is reacted with the first polymer or grafted molecule.

In the amino-containing sizing agent, amine groups may also be reacted with an additional polymer or molecule that contains at least one amine-reactive group and at least one group reactive with the matrix. The additional polymer or molecule is made to bond to the amino groups of the sizing via crosslinking or addition by virtue of its amino-reactive groups, and has a matrix-reactive group still available for bonding with the matrix. The additional polymer or molecule can be, for example, an unsaturated carboxylic acid, ester, or epoxide.

In a particular embodiment, the carbon fiber is coated with a partially crosslinked epoxy or amine sizing and the matrix contains a co-monomer that covalently bonds with the uncrosslinked epoxide or amine functionalities of the sizing. The matrix co-monomer is preferably able to participate in the polymerization mechanism of the matrix, so that a covalent bonding is also created with the polymer network of the matrix. For example, in the case of unsaturated resins, the use of 2-(dimethylamino)ethylmethacrylate permits the formation of a covalent bond with the epoxy sizing by virtue of the amine group, as well as a covalent bond with the unsaturated matrix by virtue of the methacrylate groups.

In a first embodiment, a covalent bond between the carbon fibers and the polymeric matrix is established by incorporating reactive groups in the sizing agent that react with the matrix precursor resin when the carbon fiber and the matrix precursor resin are combined. For example, the epoxy-functionalized carbon fibers can be reacted with a difunctional molecule that contains an epoxy-reactive group, for reacting with the sizing agent, as well as an unsaturated group, for reacting (typically, but by no means solely, via vinyl-addition coupling) with the matrix precursor resin. The epoxy-reactive end of the difunctional molecule becomes bound to the epoxy sizing bonded with the carbon fiber, and the unsaturated portion of the difunctional molecule is free and available for reaction with the matrix precursor resin. In particular embodiments, the difunctional molecule is an alkenyl amine, such as allylamine (2-propen-1-amine), 3-buten-1-amine, or 4-penten-1-amine, or an alkenyl alcohol, such as allyl alcohol (2-propen-1-ol), 3-buten-1-ol, 4-penten-1-ol, or 4-hydroxystyrene. By analogous means, amine-functionalized carbon fibers can be reacted with a difunctional molecule that contains an amine-reactive group, for reacting with the sizing agent, as well as an unsaturated group, for reacting with the matrix precursor resin.

In a second embodiment, a covalent bond between the carbon fibers and the polymeric matrix is established by incorporating reactive groups in the matrix precursor resin that react with the sizing agent on the carbon fiber when carbon fiber and matrix precursor resin are combined. For example, in the case of an epoxy-functionalized carbon fiber, a difunctional monomer having an unsaturated portion and an epoxy-reactive portion can be included in the matrix precursor resin. The unsaturated difunctional monomer will react with components of the matrix precursor resin via its unsaturated end (or other portion), and also covalently bond with the epoxy sizing agent on the carbon fibers via its epoxy-reactive end (or other portion). The unsaturated difunctional monomer can be, for example, an amino-containing acrylate or methacrylate, such as 2-aminoethyl methacrylate, 2-(methylamino)ethylmethacrylate, 2-(dimethylamino)-ethylmethacrylate, or any of the alkenyl amine or alkenyl alcohol difunctional molecules described above. By analogous means, in the case of an amine-functionalized carbon fiber, a difunctional monomer having an unsaturated end and an amine-reactive end can be included in the matrix precursor resin in order to cure with components of the matrix precursor resin via its unsaturated end and also covalently bond with the amine sizing agent on the carbon fibers via its amine-reactive end. In particular embodiments, the matrix contains groups that covalently bond with amine groups of the sizing agent by a Michael reaction. Alternatively, an unsaturated resin containing an acrylate monomer used as a reactive diluent reacts with amine groups of the sizing agent.

In another aspect, the invention is directed to a solid composite in which the surface-treated carbon fibers, described above, are embedded (i.e., incorporated) within a polymeric matrix. The polymer of the matrix can be any polymer suitable for use in a high strength application. The matrix polymer can be a thermoplastic or thermoset.

Some particular matrix polymers considered herein are those resulting from vinyl-addition polymerization of an unsaturated precursor resin or unsaturated monomers. By being unsaturated, the precursor resin or monomer contains carbon-carbon double bonds. The polymeric matrix can be derived from, for example, curing any of the acrylate or methacrylate monomers known in the art (e.g., acrylic acid, methacrylic acid, methylmethacrylate, hydroxyethylmethacrylate), acrylonitrile, ethylene, propylene, styrene, divinylbenzene, 1,3-butadiene, cyclopentene, vinyl acetate, vinyl chloride, or a cycloolefin (e.g., cyclohexene, cycloheptene, cyclooctene, or norbornene), or a fluorinated unsaturated monomer, such as vinylidene fluoride, fluoroethylene, or tetrafluoroethylene, or a bromated unsaturated monomer (e.g., DGEBA-based vinyl ester monomer with bromo substitution on the aromatic ring). The polymeric matrix can be a homopolymer, or alternatively, a copolymer, e.g., block, random, alternating, or graft copolymer of two or more different types of monomers, such as any of those mentioned above.

The matrix polymer can also be any of the condensation polymers known in the art. The condensation polymer can be, for example, a polyester, polyamide, polyurethane, or phenol-formaldehyde, or a copolymer thereof, or a copolymer with any of the addition polymers described above. In particular embodiments, the matrix polymer is a thermoplastic selected from polyether ether ketone (PEEK), polycarbonates, polymethacrylic acids, polyesters, polylactic acids, polyglycolic acids, thermoplastic polyurethanes, polymethacrylates, polymethylmethacrylates, Nylon 6, Nylon 6,6, polysulfones, polyvinylalcohols and polyimides.

In a first particular embodiment, the matrix polymer is derived from a vinyl ester resin by curing methods well-known in the art. Vinyl ester resins are known to possess terminal carbon-carbon double bonds. As known in the art, a vinyl ester resin is generally formed by reaction between a diepoxide, triepoxide, or higher polyepoxide (e.g., as described above under Formulas 1, 1a, and 2) and an unsaturated monocarboxylic acid, such as acrylic or methacrylic acid. The general process for producing an exemplary difunctional divinyl ester is provided as follows:

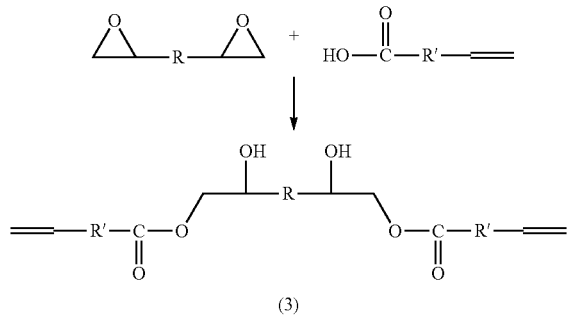

(3)

In the above scheme, Formula (3) depicts an exemplary set of difunctional divinyl esters in which R is as defined above and R' is either a bond or a hydrocarbon linker R, as defined above. In particular embodiments, the diepoxy molecule depicted in the above scheme is diglycidyl ether of bisphenol A (DGEBA).

In a second particular embodiment, the matrix polymer is derived from an unsaturated polyester resin. Unsaturated polyester resins are known to possess internal carbon-carbon double bonds. As known in the art, an unsaturated polyester resin is generally formed by reaction between a diol, triol, tetrol, or higher polyol, such as any of the polyols described above, and an unsaturated di- or tri-carboxylic acid, such as maleic, phthalic, isophthalic, or terephthalic acid. The general process for producing an exemplary unsaturated polyester resin is provided as follows:

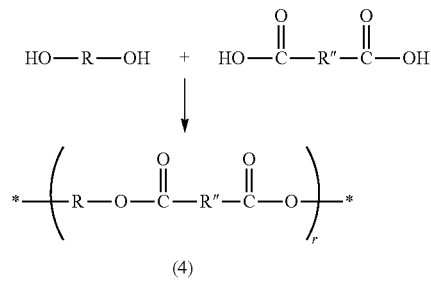

(4)

In the above scheme, Formula (4) depicts an exemplary set of unsaturated polyester resins in which R is as defined above and R" is an unsaturated hydrocarbon linker containing a reactive alkenyl group, such as any of the unsaturated hydrocarbon linkers defined for R above containing this feature, and r is generally at least 1, 2, 3, 4, or 5, and up to 6, 7, 8, 9, 10, 12, 15, 18, or 20 (or any range bounded by any two of these values). The diol HO—R—OH shown in the above scheme may be replaced with or combined with a triol, tetrol, or higher functional alcohol, or generically defined as $R-(OH)_n$, where n is as above except that it is a minimum of 2, and the dicarboxy molecule depicted in the above scheme can be replaced with or combined with a tricarboxy or higher carboxy molecule. In particular embodiments, the polyol is selected from a polyethylene glycol, such as ethylene glycol, diethylene glycol, and triethylene glycol, and the polycarboxy is selected from maleic acid, phthalic acid, isophthalic acid, and terephthalic acid.

In one embodiment, the sizing agent on the carbon fiber is not covalently bonded with the matrix polymer, although the sizing agent typically forms an interpenetrating network with the matrix polymer. In another embodiment, carbon fibers, or a portion thereof, are covalently bonded with the matrix polymer by covalent bonding between the sizing agent and the polymer matrix.

In a first embodiment, a covalent bond between the carbon fibers and the polymeric matrix is established by incorporating reactive groups in the sizing agent that react with the matrix precursor resin when the carbon fiber and the matrix precursor resin are combined. For example, the epoxy-functionalized carbon fibers can be reacted with a difunctional molecule that contains an epoxy-reactive group, for reacting with the sizing agent, as well as an unsaturated group, for reacting (typically, but by no means solely, via vinyl-addition coupling) with the matrix precursor resin. The epoxy-reactive end of the difunctional molecule becomes bound to the epoxy sizing bonded with the carbon fiber, and the unsaturated portion of the difunctional molecule is free and available for reaction with the matrix precursor resin. In particular embodiments, the difunctional molecule is an alkenyl amine, such as allylamine (2-propen-1-amine), 3-buten-1-amine, or 4-penten-1-amine, or an alkenyl alcohol, such as allyl alcohol (2-propen-1-ol), 3-buten-1-ol, 4-penten-1-ol, or 4-hydroxystyrene.

In a second embodiment, a covalent bond between the carbon fibers and the polymeric matrix is established by incorporating reactive groups in the matrix precursor resin that react with the sizing agent on the carbon fiber when the carbon fiber and the matrix precursor resin are combined. For example, an unsaturated difunctional monomer can be included in the matrix precursor resin. The unsaturated difunctional monomer will react with components of the matrix precursor resin via its unsaturated end, and also covalently bond with the epoxy sizing agent on the carbon fibers via its epoxy-reactive end. The unsaturated difunctional monomer can be, for example, an amino-containing acrylate or methacrylate, such as 2-aminoethyl methacrylate, 2-(methylamino)ethylmethacrylate, 2-(dimethylamino)-ethylmethacrylate, or any of the alkenyl amine or alkenyl alcohol difunctional molecules described above.

In another aspect, the invention is directed to a process for preparing the carbon fiber described above containing an epoxy or amine sizing agent bound to its surface. As discussed above, the original carbon fiber to be reacted with the epoxy or amine sizing agent (i.e., precursor carbon fiber) is surface-functionalized with groups reactive with the sizing agent. The initial functionalization can be provided by, for example, an electrochemical surface treatment, a plasma surface treatment, or an oxidation surface treatment coupled with a thermal surface treatment, the details of which are well known in the art.

The carbon fiber is contacted with the sizing agent under conditions, as known in the art, that permit a covalent bond to be formed between the epoxy or amine sizing agent and reactive groups located on the carbon fiber surface. In a specific embodiment, the carbon fiber is contacted with a solution or emulsion of the sizing agent, wherein the solution or emulsion of the sizing agent includes the sizing agent dispersed in a solvent carrier, e.g., water, a water-soluble solvent (e.g., acetone or methylethylketone), or other polar or non-polar solvent, or a combination thereof or aqueous solution thereof. The sizing agent can be admixed with solvent carrier in any desired concentration, but typically in an amount no more than 30% by weight of the total of sizing agent and solvent carrier, such as 1%, 2%, 5%, 10%, 15%, 20%, or 25% by weight. In particular embodiments, the sizing agent is included in the carrier solution in a concentration of up to or less than 10%, and more preferably, from 1 to 5%, 1 to 4%, 1 to 3%, or 1 to 2%. Generally, a room temperature condition (i.e., from 15-25° C., or about 20° C.) is acceptable, but an elevated temperature may also be used to facilitate bonding. An intermediate processing step, before curing, may also be included, such as a rinsing, drying, or annealing step.

The epoxy or amine sizing agent on the carbon fiber is then partially cured by reacting the sizing agent with an amount of curing agent less than the stoichiometric amount that would cause all epoxy or amine groups in the sizing agent to be crosslinked, and that retains the sizing agent in flexible form and provides a curing degree of epoxide or amine groups of no more than about 0.6. Depending on the curing methodology used, the curing step may be conducted at room temperature or at an elevated temperature. The conditions used in curing are well known in the art. A post-processing step, after curing, may also be included, such as a rinsing, drying, or annealing step.

The above-described process is particularly advantageous for the reason that it permits the sizing agent to be selectively adjusted in thickness and viscosity by appropriate adjustment in conditions used in the process. The sizing agent can be selectively adjusted in thickness by corresponding adjustment in the concentration of the sizing agent in the solution or emulsion of sizing agent, i.e., lower concentrations generally result in thinner layers of sizing agent and higher concentrations generally result in thicker layers of sizing agent. The sizing agent can be selectively adjusted in viscosity by corresponding adjustment in the amount of curing agent used, i.e., lower amounts of curing agents generally result in lower viscosities, and higher amounts of curing agents generally result in higher viscosities. When chopped carbon fibers are desired, as preferred for use in sheet molding, the thickness and the viscosity of the sizing agent are preferably high enough to make the tow relatively hard and difficult to spread. When long and continuous fibers are desired, the thickness and viscosity of the sizing agent are preferably low enough to make the tow relatively soft and easy to spread.

In another aspect, the invention is directed to a process for preparing the composite of carbon fibers embedded in polymer matrix described above. In the method, carbon fibers having surface-bound partially cured epoxy or amine sizing agent are mixed with matrix precursor resin before subjecting the mixture to a curing process. The matrix precursor resin can be any of the precursor resins described above, particularly an unsaturated precursor resin, such as a vinyl ester resin or unsaturated polyester resin.

Particularly in the case of unsaturated precursor matrix resin, it is commonplace to also include an unsaturated reactive diluent as a matrix component prior to curing. The unsaturated reactive diluent typically serves to crosslink portions of the precursor resin and facilitate interdiffusion between the epoxy or amine sizing and polymer matrix, which provides a stronger and harder matrix in the interphase region. In specific embodiments, the unsaturated reactive diluent is a molecule containing one, two, or three vinyl groups. Some examples of unsaturated reactive diluents include styrene, divinylbenzene, a methacrylate, an acrylate, a vinyl ester (e.g., vinyl acetate), or a vinyl ester resin.

The conditions used in curing such precursor resins are well known in the art, and may rely on, for example, an elevated temperature, radiative exposure (e.g., UV, microwave, or electron beam), or both, as well as the use of an initiator, such as a peroxide (e.g., cumene hydroperoxide, butanone peroxide, t-butylperoxybenzoate, benzoyl peroxide, or MEKP) or Lewis acid (e.g., $BF_3$), and if applicable, a catalyst, such as a metal-containing catalyst, e.g., a ROMP catalyst. In particular embodiments, the curing step is conducted at a temperature selected from 125° C., 130° C., 135° C., 140° C., 145° C., 150° C., 155° C., 160° C., 165° C., 170° C., 175° C., 180° C., or 185° C., or a temperature within a range bounded by any two of these values, for a curing time selected from 0.5, 1.0, 1.5, 2.0, 2.5, or 3.0 hours, or a time within a range bounded by any two of these values, wherein it is understood that higher curing temperatures generally require shorter curing times to achieve the same effect. In some embodiments, a two-step or three-step curing process is used, wherein each step employs a different temperature. Moreover, the cure can be conducted at room temperature with the help of a promoter included in the resin, such as cobalt naphthenate, cobalt octoate, or cobalt acetylacetonate, and can be accelerated by the use of a catalyst, such as N,N-dimethylaniline and similar molecules.

The solid composites described herein possess a significantly increased carbon fiber interlaminar shear strength (ILSS) relative to composites that include the same carbon fiber and epoxy sizing agent with uncured sizing agent. For example, whereas a composite with uncured sizing agent may exhibit an ILSS of about 60 MPa, the instant composites using partially cured epoxy sizing can exhibit an ILSS of at least 70, 80, 90, or 100 MPa, or an ILSS within a range bounded by any two of these values.

Examples have been set forth below for the purpose of illustration and to describe certain specific embodiments of the invention. However, the scope of this invention is not to be in any way limited by the examples set forth herein.

EXAMPLES

Overview of Experiments

Carbon fibers (IM7 from Hexcel Co. or Panex® 35 from Zoltek Co) were functionalized with Epon® 828 commercial epoxy sizing (diglycidyl ether of bisphenol A, or DGEBA) or Neoxil® 5716 (epoxy resin in non-ionic water emulsion) partially cured by Jeffamine® T-403 commercial amine curing agent, and the resulting functionalized carbon fibers impregnated with an excess of vinyl ester resin (Derakane® 782 by Ashland Co.) by layup and the excess of resin was expelled by closing the mold with pressure. The dimensions of the composite samples were controlled by the dimensions of free space in the mold, which was constant. 1.5 wt % of tert-butylperoxybenzoate (initiator) was previously added to the resin and thoroughly mixed by the use of a centrifuge (rotation speed: 3000 rpm, time: 4 minutes), which also enabled a degassing of the mix, the radical polymerization of vinyl ester resins being very sensitive to oxygen. The mold was then placed in a furnace that was digitally controlled. The volume concentration of carbon fibers, assuming that the samples were void free, was calculated to be around 60%. The thermal program for the cure was 1 hour at 150° C. The concentration of the amine curing agent (Jeffamine® T-403) in Epon® 828 was varied from 7.5 wt % to 17 wt %, with 30 wt % being the value corresponding to a stoichiometric concentration. The interlaminar shear strength (ILSS) increased from 63±3 (without epoxy sizing) to a maximum value of 97±2 MPa (an increase of +54%), which demonstrates that a curing degree of 1 (i.e., stoichiometric ratio) for the epoxy sizing is not necessary to achieve an optimal improvement of the interfacial adhesion. It is believed that the partially crosslinked epoxy sizing swells because of the diffusion of styrene and covalent bonds between the carbon fiber surface and the sizing. The tow produced herein is advantageously flexible and can be stored, which makes it particularly amenable for industrial use.

The results presented here correspond to an epoxy sizing that was made with acetone as the solvent, but the concept is completely applicable to water as the solvent, particularly since the amine and epoxy sizing agents are generally soluble in water. For example, an emulsion of epoxy monomer in water can be used. Moreover, although the epoxy monomer tested herein was DGEBA, other monomers may be used in an effort to obtain better mechanical properties for the epoxy sizing. Particularly desirable in this regard are epoxy monomers containing more than two epoxide groups, such as tetra-functionalized monomers (e.g., commercially available Araldite® MY721 from Hexion Co.). A wide variety of epoxy-amine systems can be used according to the instant methodology. The choice of the system depends on, for example, the final thermo-mechanical properties desired for the reactive epoxy sizing in terms of tensile, flexural, and shear properties, fracture resistance properties, and glass transition temperature.

The mechanical properties of the carbon fiber-matrix interface can be improved even further by creating some covalent bonding between the reactive epoxy sizing and the vinyl ester matrix, which can improve on the benefits provided by the interpenetrated networks that occur in the absence of such covalent bonding. The mixing of the vinyl ester resin with a monomer containing a tertiary amine and a methacrylate functionality is a good example.

For example, the use of a concentration between 1 and 5 wt % of 2-(dimethylamino)-ethylmethacrylate in the vinyl ester matrix significantly increased the mechanical properties of the vinyl ester composite in comparison with the use of the reactive epoxy sizing in the absence of the aforesaid agent. The unsaturated methacrylate functionality reacts with the vinyl ester and the styrene monomers/oligomers during the radical polymerization, and the tertiary amine portion completes the curing of the epoxy sizing, since a significant portion of the epoxide groups are still available for reaction.

The above covalent bonding approach maintains a significant advantage over using a coupling agent only, i.e., by the instant methodology, there remains a swelling of the reactive epoxy sizing that counteracts the negative influence of the high cure volume shrinkage of the vinyl ester matrix. The generation of extra covalent bonding between the epoxy sizing and the vinyl ester matrix induced an increase of the ILSS. The maximum value of ILSS that was obtained (101 MPa) represents an improvement of about 60% in comparison with a composite made of unsized fibers and pristine matrix.

Detailed Account of Experiments 1.1 Use of a Partially Cured Epoxy Sizing

The mix of Jeffamine® T-403 and DGEBA was made first roughly with a spatula and then thoroughly by the use of a DAMON/IEC CRU-5000 centrifuge (rotation speed: 3000 rpm, time: 4 min), which also enabled a degassing of the mix. The mix was left at room temperature for 30 minutes in order to create oligomers before being dissolved in acetone to obtain the sizing solution. The sized fibers were then dried at 90° C. for 30 minutes in order to reach the maximum curing degree of the epoxy before the manufacture of the composite.

Neoxil® 5716 (epoxy resin in non ionic water emulsion) was mixed with Jeffamine® T-403 with the use of a magnetic stirrer. The mix was left 1 hour at room temperature before being diluted in water to obtain the sizing solution. The sized fibers were then dried at 110° C. for 1 hour in order to reach the maximum curing degree of the epoxy before the manufacture of the composite.

1.2 Grafting of Epoxy Functionalities on the Carbon Fiber Surface Prior to the Sizing with a Partially Cured Epoxy Sizing A sizing solution of 0.5 wt % of ethylene glycol diglycidyl ether in water was used. The sized fibers were then dried at 150° C. for at least 30 minutes. A sample of those fibers was extracted in water with a Soxhlet extraction device for 24 hours to remove any non-grafted material from the surface of the carbon fiber. An X-ray Photoelectron spectroscopy (XPS) analysis revealed a grafting of the ethylene glycol diglycidyl ether by reaction of the epoxy functionalities with hydroxyl groups located at the surface of the fiber. A thermogravimetric analysis of the same sample confirmed the grafting (relative loss of 0.3-0.5 wt % after an analysis performed as described in section 1.3.1).

1.3 Use of a Partially Cured Epoxy Coating Functionalized with Vinyl Groups that can Create Covalent Bonds with the Matrix 1,2-epoxy-9-decene and Jeffamine® T-403 were mixed with a magnetic stirrer at 90° C. for 3 hours. DGEBA was then added to the mix with a spatula first and the by using a DAMON/IEC CRU-5000 centrifuge (rotation speed: 3000 rpm, time: 4 min) The mix was left at room temperature for 30 minutes in order to create oligomers before being dissolved in acetone to obtain the sizing solution. The sized fibers were then dried at 90° C. for 30 minutes in order to reach the maximum curing degree of the epoxy before the manufacture of the composite.

1.4 Use of a Partially Cured Epoxy Sizing and Adding of a Co-monomer in the Matrix The epoxy sizing was prepared following the same protocol as the one described in section 1.1. 2-(dimethylamino) ethylmethacrylate (co-monomer) was added to the vinyl ester matrix and the mix was centrifuged with the help of a DAMON/IEC CRU-5000 centrifuge (rotation speed: 3000 rpm, time: 4 min), which also enabled a degassing of the mix. In the experiment, the co-monomer copolymerizes with the matrix and creates covalent bonds with the unreacted epoxide groups of the epoxy sizing.

1.5 Manufacture of the Vinyl Ester Composite 1.5 wt % of tert-butylperoxybenzoate (initiator) was added and thoroughly mixed with the vinyl ester (or vinyl ester+additives) by the use of a DAMON/IEC CRU-5000 centrifuge (rotation speed: 3000 rpm, time: 4 min) Unidirectional composite panels were obtained by winding the carbon fibers around a steel frame and placing them in a two-piece steel mold. The fibers were impregnated with an excess of resin by layup with use of a roller made out of Teflon®. When closing the mold with pressure, the excess of resin was expelled. The dimensions of free space in the mold controlled the dimensions of the composite samples, which was constant. The mold was then placed in a furnace that was digitally controlled, so that the thermal history was identical for all the samples. The thermal program for the cure was 1 hour at 150° C. The volume fraction of fibers was 60%.

1.6 Measurement of the Thickness of the Sizing by Thermogravimetric Analysis (TGA)

A high resolution thermogravimetric analyzer (Q500, TA Instruments), controlled by Thermal Advantage® software was used to measure weight loss as a function of temperature and under nitrogen. The ramp was 10° C.min$^{-1}$ from room temperature to 600° C., with a resolution of 4° C. The data were analyzed using Universal Analysis 2000® Software.

The value of the thickness t was determined using Equation 1, assuming that all of the sizing was removed during the TGA analysis and assuming that the sizing was evenly spread at the surface of the single fibers in the tow.

$$t = \sqrt{\frac{R^2(l \times d_f + d_s(1-l))}{d_s(1-l)}} - R \quad \text{(Equation 1)}$$

In the Equation 1 above, R is the radius of the fiber, l is the relative weight loss of the sample during the analysis, $d_f$ is the density of the fiber, and $d_s$ is the density of the sizing.

1.7 Measurement of the Curing Degree of the Matrix by Fourier Transform Infra Red Spectroscopy (FTIR)

A Bruker® Vertex 70 Infra-Red spectrometer was used in transmission mode and was controlled by software Opus 6.5®. Data were collected between 400 cm$^{-1}$ and 4400 cm$^{-1}$. The resolution was 4 cm$^{-1}$. Each spectrum was an average of 60 scans. The curing degree of the resin π was calculated with Equation 2 by following the decrease of the intensity of the peak located at 916 cm$^{-1}$ corresponding to epoxy groups, using the band at 1184 cm$^{-1}$ (C—H covalent bond located on benzene rings) as internal reference.

$$\pi = 1 - \frac{\frac{I_c^{916}}{I_c^{1184}}}{\frac{I_0^{916}}{I_0^{1184}}} \quad \text{(Equation 2)}$$

In the Equation 2 above, $I_c^{926}$ and $I_c^{1184}$ are the intensities of the two peaks corresponding to the cured sample, and $I_0^{916}$ and $I_0^{1124}$ are the intensities of the two peaks corresponding to the neat resin.

1.8 Measurement of the InterLaminar Shear Strength (ILSS) of the Composites by the Use of the Short Beam Shear Test The short beam shear test was performed according to ASTM D2344. The dimensions of the specimens were 19.2 mm×6.4 mm×3.2 mm and the span-to-depth ratio was 4. A MTS Alliance RT/5 twin screw load frame was used with a 5 kN load cell. The testing device was controlled by the software Testworks® 4. Ten specimens were tested for each composite system.

TABLE 1

Optimization of the curing degree of the epoxy sizing. Fibers: IM7. Matrix: Derakane® 782

| Concentration of Jeffamine T-403 in DGEBA (wt %) | 7.5 | 10 | 12 | 13.5 | 15 | 17 |
|---|---|---|---|---|---|---|
| Curing degree of the epoxy sizing | 0.21 | 0.25 | 0.38 | 0.41 | 0.50 | 0.54 |
| Thickness (nm) | 112 | 136 | 142 | 152 | 176 | 212 |
| ILSS (MPa) | 90 ± 3 | 92 ± 3 | 93 ± 2 | 97 ± 2 | 90 ± 3 | 83 ± 3 |

TABLE 2

Optimization of the thickness of the epoxy sizing with a curing degree. Fibers: IM7. Matrix: Derakane® 782

| Concentration of Jeffamine T-403 in DGEBA (wt %) | 12 | 12 | 13.5 | 13.5 | 15 | 15 |
|---|---|---|---|---|---|---|
| Curing degree of the epoxy sizing | 0.38 | 0.38 | 0.41 | 0.41 | 0.5 | 0.5 |
| Thickness (nm) | 85 | 142 | 92 | 152 | 110 | 176 |
| ILSS (MPa) | 84 ± 1 | 93 ± 2 | 88 ± 2 | 97 ± 2 | 82 ± 2 | 90 ± 3 |

TABLE 3

Grafting of epoxide groups at the surface of the carbon fiber prior to the sizing. Fibers IM7. Matrix: Derakane® 782

| Concentration of Jeffamine T-403 in DGEBA (wt %) | 12 | 12 | 12 | 12 | 13.5 | 13.5 | 13.5 | 13.5 | 15 | 15 |
|---|---|---|---|---|---|---|---|---|---|---|
| Curing degree of the epoxy sizing | 0.38 | 0.38 | 0.38 | 0.38 | 0.41 | 0.41 | 0.41 | 0.41 | 0.5 | 0.5 |
| Thickness (nm) | 85 | 108 | 142 | 208 | 92 | 115 | 152 | 225 | 110 | 133 |
| Grafting of epoxy groups | No | Yes | No | Yes | No | Yes | No | Yes | No | Yes |
| ILSS (MPa) | 84 ± 1 | 92 ± 3 | 93 ± 2 | 95 ± 2 | 88 ± 2 | 92 ± 2 | 97 ± 2 | 94 ± 2 | 82 ± 2 | 96 ± 3 |

TABLE 4

Use of a thermo-chemical surface treatment prior to the grafting of epoxide groups and sizing. Fibers: IM7. Matrix: Derakane® 782.

| Concentration of Jeffamine T-403 in DGEBA (wt %) | 13.5 | 13.5 | 13.5 | 13.5 |
|---|---|---|---|---|
| Curing degree of the epoxy sizing | 0.41 | 0.41 | 0.41 | 0.41 |
| Thickness (nm) | 152 | 225 | 135 | 206 |
| Thermo-chemical surface treatment | No | No | Yes | Yes |

TABLE 4-continued

Use of a thermo-chemical surface treatment prior to the grafting of epoxide groups and sizing. Fibers: IM7. Matrix: Derakane ® 782.

| Grafting of epoxide groups | No | Yes | No | Yes |
|---|---|---|---|---|
| ILSS (MPa) | 97 ± 2 | 94 ± 2 | 86 ± 2 | 87 ± 2 |

Note:
The decrease of the mechanical properties is due to the fact that the interfacial adhesion has become too strong and has led to an increase of the brittleness of the material.

TABLE 5

Use of a 50,000 filament tow (Panex ® 35 Zoltek fibers, surface treated and non-sized). Matrix: Derakane ® 781

| Concentration of Jeffamine T-403 in DGEBA (wt %) | 13.5 | 13.5 | 13.5 | 13.5 | 13.5 |
|---|---|---|---|---|---|
| Curing degree of the epoxy sizing | 0.41 | 0.41 | 0.41 | 0.41 | 0.41 |
| Thickness (nm) | 70 | 115 | 90 | 145 | 88 |
| Thermo-chemical surface treatment | No | No | No | No | Yes |
| Grafting of epoxide groups | No | Yes | No | Yes | No |
| ILSS (MPa) | 88 ± 3 | 92 ± 3 | 92 ± 3 | 92 ± 3 | 87 ± 2 |

TABLE 6

Use of a quadra epoxy monomer (Araldite MY 721). Fibers: IM7. Matrix: Derakane ® 781

| Concentration of Aradur 9719-1 in Araldite MY 721 (wt %) | 7.7 | 7.7 | 11.5 | 11.5 | 15.3 | 15.3 |
|---|---|---|---|---|---|---|
| Curing degree of the epoxy sizing | 0.19 | 0.19 | 0.28 | 0.28 | 0.34 | 0.34 |
| Thickness (nm) | 99 | 108 | 111 | 146 | 132 | 165 |
| Grafting of epoxide groups | No | Yes | No | Yes | No | Yes |
| ILSS (MPa) | 90 ± 3 | 95 ± 3 | 88 ± 2 | 82 ± 2 | 89 ± 3 | 83 ± 3 |

TABLE 7

Use of a quadra epoxy monomer (Araldite MY721) and a 50,000 filament tow. Fibers: Panex ® 35. Matrix: Derakane ® 781.

| Concentration of Aradur 9719-1 in Araldite MY 721 (wt %) | 7.7 | 7.7 | 15.3 | 15.3 |
|---|---|---|---|---|
| Curing degree of the epoxy sizing | 0.19 | 0.19 | 0.34 | 0.34 |
| Thickness (nm) | 75 | 93 | 125 | 138 |
| Grafting of epoxide groups | No | Yes | No | Yes |
| ILSS (MPa) | 83 ± 4 | 88 ± 4 | 84 ± 3 | 83 ± 3 |

TABLE 8

Use of an emulsion of an epoxy monomer in water. Fibers: Zoltek. Matrix: Derakane ® 781

| Concentration of Jeffamine T-403 in Neoxil 5716 | 10.9 | 17.2 | 13.5 | 13.5 |
|---|---|---|---|---|

TABLE 8-continued

Use of an emulsion of an epoxy monomer in water. Fibers: Zoltek. Matrix: Derakane ® 781

| (vol %) | | | | |
|---|---|---|---|---|
| Thickness (nm) | 59 | 71 | 82 | 102 |
| Thermo-chemical surface treatment | No | No | Yes | Yes |
| Grafting of epoxide groups | No | No | No | Yes |
| ILSS (MPa) | 84 ± 4 | 88 ± 2 | 91 ± 2 | 88 ± 2 |

TABLE 9

Grafting of vinyl groups at the surface of the epoxy sizing with the use of. 1,2-Epoxy-9-decene. Fibers IM7. Matrix: Derakane ® 781

| Concentration of Jeffamine T-403 in mix (wt %) | 18.3 | 15.2 | 12.7 |
|---|---|---|---|
| Concentration of 1,2-Epoxy-9-decene (wt %) | 12.4 | 10.9 | 10.1 |
| Thickness (nm) | 178 | 165 | 148 |
| ILSS (MPa) | 73 ± 3 | 80 ± 2 | 100 ± 3 |

TABLE 10

Use of a partially cured epoxy sizing and a commoner that can create covalent bond with unreacted epoxy groups (concentration of Jeffamine T-403 in the sizing of 13.5 wt % and thickness of 135 nm)

| Concentration of 2-(dimethylamino)ethylmethacrylate in Derakane ® 781 (wt %) | 1 | 2 | 5 |
|---|---|---|---|
| ILSS (MPa) | 95 ± 2 | 100 ± 2 | 93 ± 2 |

While there have been shown and described what are at present considered the preferred embodiments of the invention, those skilled in the art may make various changes and modifications which remain within the scope of the invention defined by the appended claims.

What is claimed is:

1. A method of making a carbon fiber having on its surface a partially cured sizing agent, the method comprising covalently binding on the surface of said carbon fiber a sizing agent comprised of an epoxy resin, and partially curing said sizing agent by contact thereof with a curing agent such that at least a portion of epoxide groups remain uncrosslinked on said surface, which corresponds to a curing degree of epoxide groups of no more than about 0.6, and further comprising reacting at least a portion of said epoxide groups with a bifunctional molecule that contains first and second reactive groups, the first reactive group being reactive with an epoxide group and thus forming a covalent bond with the epoxy group, and the second reactive group being unsaturated and reactive with a carbon-carbon double bond via a vinyl addition reaction, wherein said second reactive group is unreacted and accessible for reaction with a carbon-carbon double bond of an unsaturated resin.

2. The method of claim 1, wherein less than a stoichiometric amount of said curing agent is used.

3. The method of claim 1, wherein, prior to covalent binding of said sizing agent on the surface of the carbon fiber, said carbon fiber is surface-treated by a process that incorporates on said surface reactive functional groups that react with and form covalent bonds with said sizing agent.

4. The method of claim 3, wherein said reactive functional groups are selected from hydroxyl, carboxyl, and amine groups.

5. The method of claim 1, wherein said epoxy resin is comprised of a difunctional epoxy resin.

6. The method of claim 5, wherein said difunctional epoxy resin is selected from one or both of bisphenol A diglycidyl ether and ethylene glycol diglycidyl ether.

7. The method of claim 1, wherein said epoxy resin is a trifunctional or a higher functional epoxy resin.

8. The method of claim 1, wherein said curing agent is comprised of an organoamine containing at least two amine groups selected from primary and secondary amine groups.

9. The method of claim 1, wherein an amount of curing agent is selected that provides a curing degree of surface epoxide groups of no more than about 0.6.

10. The method of claim 1, wherein an amount of curing agent is selected that provides a curing degree of surface epoxide groups of no more than about 0.5.

11. The method of claim 1, wherein an amount of curing agent is selected that provides a curing degree of surface epoxide groups of no more than about 0.4.

12. The method of claim 1, wherein said partially cured sizing agent is a flexible gel.

13. The method of claim 1, wherein said sizing agent is made to covalently bind to the surface of the carbon fiber by, first, providing a carbon fiber containing on its surface groups reactive with said sizing agent to form a covalent bond with said sizing agent, and contacting said carbon fiber with a solution or emulsion of said sizing agent under conditions that cause the sizing agent to react with surface reactive groups and form covalent bonds with the carbon fiber, wherein said solution or emulsion is comprised of said sizing agent dispersed in a solvent carrier.

14. The method of claim 13, wherein said sizing agent is in an amount of up to 10% by weight in said solution or emulsion.

15. The method of claim 13, wherein said solvent carrier is aqueous.

16. The method of claim 13, wherein the sizing agent on the carbon fiber is selectively adjusted in thickness by corresponding selective adjustment in the concentration of the sizing agent in said solution.

17. The method of claim 1, wherein the sizing agent on the carbon fiber is selectively adjusted in viscosity by corresponding selective adjustment in the amount of curing agent used.

* * * * *